US009244897B1

(12) United States Patent
Sebastian

(10) Patent No.: US 9,244,897 B1
(45) Date of Patent: Jan. 26, 2016

(54) METHODS AND SYSTEMS FOR JAVASCRIPT PARSING

(71) Applicant: ViaSat Inc., Carlsbad, CA (US)

(72) Inventor: William B. Sebastian, Falmouth, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 14/623,200

(22) Filed: Feb. 16, 2015

Related U.S. Application Data

(63) Continuation of application No. 13/967,924, filed on Aug. 15, 2013, now Pat. No. 8,984,095, which is a continuation of application No. 12/172,917, filed on Jul. 14, 2008, now Pat. No. 8,549,099.

(60) Provisional application No. 60/949,493, filed on Jul. 12, 2007.

(51) Int. Cl.
*G06F 15/16* (2006.01)
*G06F 17/22* (2006.01)
*G06F 17/30* (2006.01)

(52) U.S. Cl.
CPC ...... *G06F 17/2247* (2013.01); *G06F 17/30896* (2013.01)

(58) Field of Classification Search
CPC .... H04L 9/3213; G06F 8/428; G06F 17/2705
USPC .......................................................... 709/217
See application file for complete search history.

(56) References Cited

U.S. PATENT DOCUMENTS

| 6,964,014 | B1 * | 11/2005 | Parish | 715/205 |
|---|---|---|---|---|
| 2002/0116411 | A1 * | 8/2002 | Peters et al. | 707/501.1 |
| 2006/0150076 | A1 * | 7/2006 | Starbird | 715/501.1 |
| 2008/0225719 | A1 * | 9/2008 | Korrapati et al. | 370/235 |
| 2008/0228899 | A1 * | 9/2008 | Plamondon | 709/219 |
| 2008/0229381 | A1 * | 9/2008 | Sikka et al. | 726/1 |
| 2010/0088398 | A1 * | 4/2010 | Plamondon | 709/220 |

* cited by examiner

*Primary Examiner* — Arvin Eskandarnia
(74) *Attorney, Agent, or Firm* — Marsh Fischmann & Breyfogle LLP; Daniel J. Sherwinter

(57) ABSTRACT

The present invention relates to systems, apparatus, and methods of parsing a script within an HTML page. The method includes receiving a script object, where the script object includes text. The method further includes parsing the text of the script object for tokens and comparing the parsed tokens with a valid tokens list to determine locations within the text of the script object that include potential universal resource locators (URLs). The method includes parsing before and after the determined locations until complete URLs are constructed, and forwarding the complete URLs to a detector. The detector then determines whether the complete URLs are valid. The method then sends object retrieval requests to websites associated with the valid complete URLs.

18 Claims, 6 Drawing Sheets

METHODS AND SYSTEMS FOR JAVASCRIPT PARSING

PRIORITY CLAIM

This application is a claims priority to U.S. patent application Ser. No. 13/967,924, filed Aug. 15, 2013, titled "Methods and Systems for Javascript Parsing," which is a continuation of U.S. patent application Ser. No. 12/182,917, now U.S. Pat. No. 8,549,099, filed Jul. 14, 2008, titled "Methods and Systems for Javascript Parsing," and to U.S. Provisional Application Ser. No. 60/949,493, filed Jul. 12, 2007, entitled "Methods and Systems for Java Script Parsing," all of which are hereby incorporated by reference herein in their entirety for all purposes.

FIELD OF THE INVENTION

The present invention relates, in general, to network acceleration and, more particularly, to JavaScript®[1] parsing.

BACKGROUND

Presently, many objects that are downloaded when rendering a web page result from references to universal resource locators (URLs) are embedded within JavaScript. For example, a web page may include a table of icons that appear within a JavaScript on the page and the icons to be displayed may depend on a state, such as whether the mouse is over the icon. The icons are small objects for which prefetching is highly beneficial (i.e., it is advantageous to prefetch both copies: mouse over and mouse not over). In order to prefetch the items, the JavaScript must be parsed in order to determine the URLs for each of the icons.

Currently, JavaScript parsers maintain a complicated state machine. In order to execute the code correctly, the parser must start at the beginning of the script and adjust its state in response to each text character. In addition, the scripts may refer to other scripts and possibly on other pages, which further increases the state machine's complexity. This type of parsing is too taxing on the resources of a central processing unit (CPU) to be performed on, for example, a proxy server that is providing network acceleration for a large number of clients simultaneously. In addition, the scripts may include functions that depend on objects (e.g., cookies) or machine state (e.g., mouse position, browser configurations, etc.) that are not known to a proxy server which is remotely located. Thus, a conventional parser is both too slow and inherently unsuited to identify embedded references (among other things) for the purposes of prefetching (as well as network acceleration). Hence, there is a need for improved methods and systems in the art.

BRIEF SUMMARY

Embodiments of the present invention are directed to a method of parsing a script within an HTML page. The method includes receiving a script object, where the script object includes text. The method further includes parsing the text of the script object for tokens and comparing the parsed tokens with a valid tokens list to determine locations within the text of the script object that include potential universal resource locators (URLs). The method includes parsing before and after the determined locations until complete URLs are constructed and forwarding the complete URLs to a detector. The detector then determines whether the complete URLs are valid. The method then sends object retrieval requests to websites associated with the valid complete URLs.

According to further embodiments, a system for accelerating network communications is described. The system includes a client system having a proxy client. The proxy client is configured to intercept a content request generated by the client and to transmit the request. The system further includes a proxy server coupled with the client system via the proxy client. The proxy server includes a script parser configured to receive a script object, where the script object includes text. The script parser is further configured to parse the text of the script object for tokens and to compare the parsed tokens with a valid tokens list to determine locations within the text of the script object that include potential URLs.

The script parser is further configured to parse before and after the determined locations until complete URLs are constructed. The proxy server further includes a detector which is configured to receive the complete URLs in order to determine whether the complete URLs are valid. The system further includes a content server coupled with the proxy server. The content server is configured to receive object retrieval requests associated with the valid complete URLs from the proxy server and to transmit objects associated with the valid completed URLs to the proxy server.

In yet another embodiment, a script parser for parsing script objects is described. The script parser includes a syntax dictionary which is configured to receive script text and compare portions of the received script text with a valid tokens list to determine locations within the text of the script object that include potential URLs. The script parser further includes a URL rules detector coupled with the syntax dictionary. The URL rules detector is configured to determine whether the complete URLs are valid.

In an alternative embodiment, a machine-readable medium is described. The machine-readable medium is for parsing script files and including sets of instructions stored thereon which, when executed by a machine, cause the machine to execute the following method. The method includes receiving a script object, where the script object includes text. The method further includes parsing the text of the script object for tokens and comparing the parsed tokens with a valid tokens list to determine locations within the text of the script object that include potential URLs. The method includes parsing before and after the determined locations until complete URLs are constructed and forwarding the complete URLs to a detector. The detector then determines whether the complete URLs are valid. The method then sends object retrieval requests to websites associated with the valid complete URLs.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to improved JavaScript parsing. Rather than create a complex state machine and update the state machine for every byte processed, the present invention scans for a specific list of tokens, such as ".gif" or ".jpg", which are highly likely to be associated with a universal resource locator (URL) that might be requested when the browser is parsing that script. This token search can be performed at high speeds using various programming techniques, such as converting to 4-byte tokens and using integer comparisons rather than sting searches, among other techniques. Hence, the computational cost of finding the tokens is thus quite small.

Figure 1:
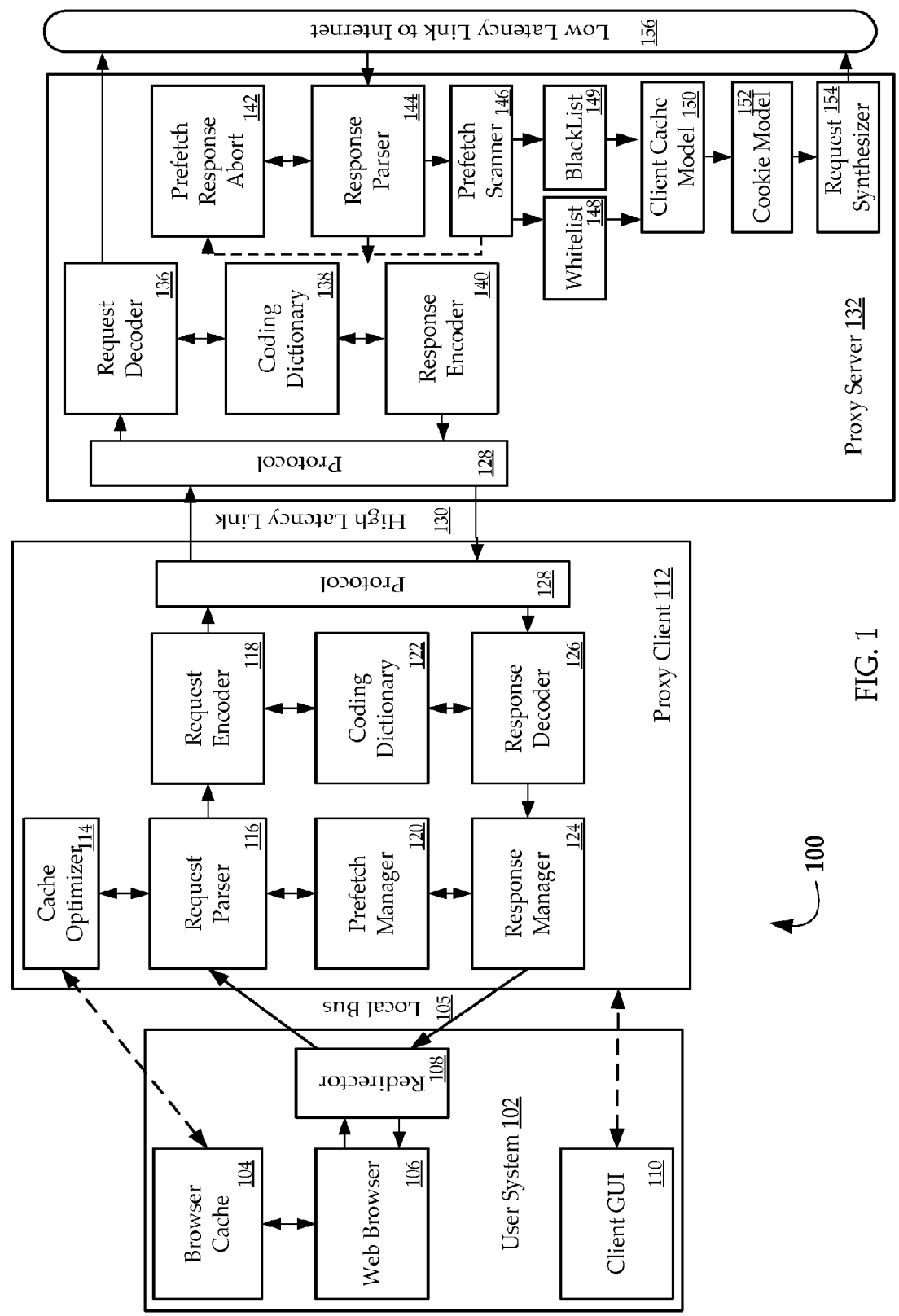
FIG. 1 is a block diagram illustrating a system for implementing JavaScript parsing, according to embodiments of the present invention.

Turning now to FIG. 1, which illustrates a system 100 for optimizing transfer of content from the Internet to a web browser. In one embodiment, the system may include a user system 102, a proxy client 112 and a proxy server 132. The user system may include a client graphical user interface (GUI) 110. Client GUI 110 may allow a user to configure performance aspects of system 100. For example, the user may adjust the compression parameters and/or algorithms, content filters (e.g., blocks elicit websites), and enable or disable various features used by system 100. In one embodiment, some of the features may include network diagnostics, error reporting, as well as controlling, for example, prefetch response abort 142. Such control may be adding and/or removing pages (i.e. URLs) to or from whitelist 148 and/or blacklist 149.

In one embodiment, the user selects a URL address which directs web browser 106 (e.g., Microsoft® Internet Explorer®[2], Mozilla® Firefox®[3], Netscape Navigator®[4], etc.) to a website (e.g., webpage.com, internetsite.com, etc.). In a further embodiment, web browser 106 may check browser cache 104 to determine whether the website associated with the selected URL is located within browser cache 104. If the website is located within browser cache 104, the amount of time the website has been in the cache is checked to determine if the cached website is "fresh" (i.e. new) enough to use. For example, the amount of time that a website may be considered fresh may be 5 minutes; however, other time limits may be used. Consequently, if the website has been cached and the website is considered fresh, then web browser 106 renders the cashed page. However, if the website has either not been cached or the cached webpage is not fresh, web browser 106 sends a request to the Internet for the website.

In one embodiment, redirector 108 intercepts the request sent from web browser 106. Redirector 108 instead sends the request through a local bus 105 to proxy client 112. In some embodiments, proxy client 112 may be implemented as a software application running on user system 102. In an alternative embodiment, proxy client 112 may be implemented on a separate computer system and is connected to user system 102 via a high speed/low latency link (e.g., a branch office LAN subnet, etc.). In one embodiment, proxy client 112 includes a request parser 116. Request parser 116 may check cache optimizer 114 to determine if a cached copy of the requested website may still be able to be used. Cache optimizer 114 is in communication with browser cache 104 in order to have access to cached websites. Cache optimizer 114 is able to access browser cache 104 without creating a redundant copy of the cached websites, thus requiring less storage space.

According to one embodiment, cache optimizer 114 implements more effective algorithms to determine whether a cached website is fresh. In one embodiment, cache optimizer 114 may implement the cache expiration algorithms from hypertext transfer protocol (HTTP) v1.1 (i.e., RFC 2616), which may not be natively supported in web browser 106. For example, browser cache 104 may inappropriately consider a cached website as too old to use; however, cache optimizer 114 may still be able to use the cached website. More efficient use of cached websites can improve browsing efficiency by reducing the number of Internet accesses.

In one embodiment, if the requested website is not able to be accessed from the cached websites, request parser 116 checks prefetch manager 120 to determine if the requested website has been prefetched. Prefetching a website is when content from the website is accessed, downloaded and stored before a request to the website is made by web browser 106. Prefetching can potentially save round-trips of data access from user system 102 to the Internet. Prefetching may be according to the methods disclosed in U.S. Provisional Application Ser. No. 60/949,492, filed on Jul. 12, 2007, entitled, "METHODS AND SYSTEMS FOR PERFORMING A PREFETCH ABORT OPERATION", which is incorporated by reference for any and all purposes.

In a further embodiment, if the requested website has not been prefetched, then request parser 116 forwards the request to a request encoder 118. Request encoder 118 encodes the request into a compressed version of the request using one of many possible data compression algorithms. For example, these algorithms may employ a coding dictionary 122 to store strings so that data from previous web objects can be used to compress data from new pages. Accordingly, where the request for the website is 550 bytes in total, the encoded request may be as small as 50 bytes. This level of compression can save bandwidth on a connection, such as high latency link 130. In one embodiment, high latency link 130 may be a wireless link, a cellular link, a satellite link, a dial-up link, etc.

In one embodiment, after request encoder 118 generates an encoded version of the request, the encoded request is forwarded to a protocol 128. In one embodiment, protocol 128 is Intelligent Compression Technologies, Inc. (ICT) transport protocol (ITP). Nonetheless, other protocols may be used, such as the standard transmission control protocol (TCP). In one embodiment, ITP maintains a persistent connection with proxy server 132. The persistent connection between proxy client 112 and proxy server 132 enables system 100 to eliminate the inefficiencies and overhead costs associated with creating a new connection for each request.

In one embodiment, the encoded request is forwarded from protocol 128 to request decoder 136. Request decoder 136 uses protocol 128 which is appropriate for the encoding performed by request encoder 118. In one embodiment, this process utilizes a coding dictionary 138 in order to translate the encoded request back into a standard format which can be accessed by the destination website. Furthermore, if the HTTP request includes a cookie (or other special instructions), such as a "referred by" or type of encoding accepted, information about the cookie or instructions may be stored in a cookie model 152. Request decoder 136 then transmits the decoded request to the destination website over a low latency link 156. Low latency link 156 may be, for example, a cable modem connection, a digital subscriber line (DSL) connection, a T1 connection, a fiber optic connection, etc.

In response to the request, a response parser 144 receives a response from the requested website. In one embodiment, this response may include an attachment, such as an image and/or text file. Some types of attachments, such as HTML, XML, CSS, or JavaScript, may include references to other "in-line" objects that may be needed to render a requested web page. In one embodiment, when response parser 144 detects an attachment type that may contain such references to "in-line" objects, response parser 144 may forward the objects to a prefetch scanner 146.

In one embodiment, prefetch scanner 146 scans the attached file and identifies URLs of in-line objects that may be candidates for prefetching. For example, candidates may be identified by HTML syntax, such as the token "img src=". In addition, objects that may be needed for the web page may also be specified in JavaScript that appear within the HTML or CSS page or within a separate JavaScript file. Potential URLs may be determined by parsing JavaScript objects using a JavaScript parser 205, described below in FIG. 2, to construct additional URLs embedded within the JavaScript. In addition to JavaScript objects, other programming languages may be parsed. For example, active server page (ASP) and/or personal hypertext processor (PHP) scripting, etc., may be used in place of JavaScript. In one embodiment, the identified candidates are added to a candidate list.

In one embodiment, for the candidate URLs, prefetch scanner 146 may notify prefetch response abort 142 of the context in which the object was identified, such as the type of object in which the content was found and/or the syntax in which the URL occurred. This information may be used by prefetch response abort 142 to determine the probability that the URL will actually be requested by web browser 106.

According to a further embodiment, the candidate list is forwarded to whitelist 148 and blacklist 149. Whitelist 148 and blacklist 149 may be used to track which URLs should be allowed to be prefetched. Based on the host (i.e. the server that is supplying the URL), the file type (e.g., ASP files should not be prefetched), etc. Accordingly, whitelist 148 and blacklist 149 control prefetching behavior by indicating which URLs on the candidate list should or should not be prefetched. In many instances, with certain webpages/file types, prefetching may not work. In addition to ASP files, webpages which include fields or cookies may have problems with prefetching.

In one embodiment, once the candidate list has been passed through whitelist 148 and blacklist 149, a modified candidate list is generated, and then the list is forwarded to a client cache model 150. The client cache model 150 attempts to model which items from the list will be included in browser cache 104. As such, those items are removed from the modified candidate list. Subsequently, the updated modified candidate list is forwarded to a request synthesizer 154 which creates an HTTP request in order to prefetch each item in the updated modified candidate list. The HTTP request header may include cookies and/or other instructions appropriate to the web site and/or to the preferences of web browser 106 using information obtained from cookie model 152. The prefetch HTTP requests may then be transmitted through low latency link 156 to the corresponding website.

In one embodiment, response parser 144 receives a prefetch response from the website and accesses a prefetch response abort 142. Prefetch response abort 142 is configured to determine whether the prefetched item is worth sending to user system 102. Prefetch response abort 142 bases its decision whether to abort a prefetch on a variety of factors, which are discussed below in more detail.

If the prefetch is not aborted, response parser 144 forwards the response to response encoder 140. Response encoder 140 accesses coding dictionary 138 in order to encode the prefetched response. Response encoder 140 then forwards the encoded response through protocol 128 over high latency link 130 and then to response decoder 126. Response decoder 126 decodes the response and forwards the response to response manager 124. In one embodiment, if the response is a prefetched response then response manager 124 creates a prefetch socket to receive the prefetched item as the prefetched item is downloaded.

Response manager 124 transmits the response over local bus 105 to redirector 108. Redirector 108 then forwards the response to web browser 106 which renders the content of the response.

Aspects of the invention include a JavaScript parser which is configured to search a sub-set of a JavaScript object in order to locate potential URLs for prefetching. The entire JavaScript code does not need to be interpreted/executed in order to locate potential URLs for prefetching. Instead, the JavaScript object may be searched for key tokens that may be constructed into URLs. Valid URLs may then be forwarded to prefetch response abort 142 in order to determine if prefetching the URL is cost effective.

Further aspects of the invention relate to the reality that many objects that are downloaded when rendering a web page may result from references to URLs embedded within JavaScript. For example, a web page may include a table of icons which appear within a JavaScript on the page. The icons to be displayed may depend on state, such as whether the mouse pointer is hovering over the icon. In one embodiment, the icons are small objects for which prefetching may be highly beneficial. Furthermore, it may be advantageous to prefetch both copies of the icon (i.e., the mouse over and the mouse not over versions). In order to prefetch such icons, the JavaScript would need to be parsed in order to determine the URLs for each icon.

A further aspect of the invention involves the creation of a simple state machine which scans for specific tokens within the JavaScript rather than fully execute the JavaScript code.

The token search can be performed at high speeds using various programming techniques, such as converting to 4-byte tokens and using integer comparisons rather than string searches. Accordingly, the computational cost of finding the tokens is relatively small.

Figure 2:
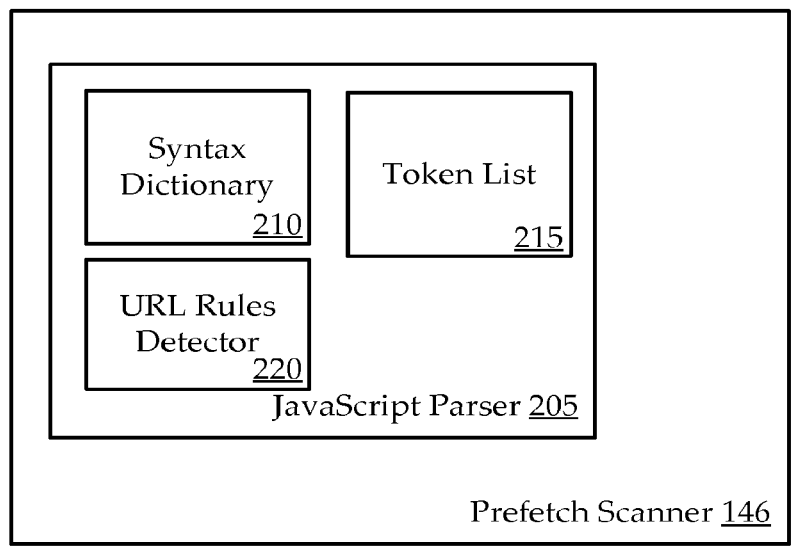
FIG. 2 is a block diagram further illustrating JavaScript parsing according to one embodiment of the present invention.

Turning now to FIG. 2, which illustrates a further embodiment of prefetch scanner 146. In one embodiment, prefetch scanner 146 includes JavaScript parser 205, which may be used to parse JavaScript objects included in candidate objects found in the candidate list. JavaScript is a programming language which includes a series of instructions that are interpreted/executed by a JavaScript interpreter. However, in the context of prefetching, it may not be inefficient for a server (e.g., proxy server 132 (FIG. 1)) to fully interpret the JavaScript in order to find candidate URLs, whereas parsing for certain JavaScript syntax and/or tokens is less processor intensive and can easily be computed by a server.

Thus, even though a complete interpretation/execution of the JavaScript is not performed, the text (i.e., the JavaScript code) of the JavaScript object can be parsed in order to find embedded URLs that may be prefetching candidates. In one embodiment, JavaScript parser 205 includes a syntax dictionary 210. Syntax dictionary 210 may be used to compare the JavaScript text against while searching for potential URLs within the JavaScript text. Syntax dictionary 210 may include a list of syntax and/or tokens (e.g., ".gif", ".jpg", etc.) which, when found within the JavaScript text, could potentially be constructed into candidate URLs.

In one embodiment, as JavaScript parser 205 parses through the JavaScript text, the JavaScript parser accesses syntax dictionary 210 to compare the currently parsed text with the tokens included in syntax dictionary 210. If a match is found, JavaScript parser 205 may continue to parse around (e.g., before and after the text) the text of the identified token to construct a URL. JavaScript parser 205 may access syntax dictionary 210 in order to identify syntax that would be useful in constructing the URL. For example, the "+" operator is used to concatenate strings in JavaScript code. Therefore, if JavaScript parser 205 finds, for example, ".gif" and then parses the text before and after to find "http://webpage.com/images/"+"videoIcon.gif", then JavaScript parser 205 would concatenate the string according to JavaScript syntax found in syntax dictionary 210 to be "http://webpage.com/images/videoIcon.gif". The potential URL "http://webpage.com/images/videoIcon.gif" may then be forwarded to a URL rules detector 220.

In a further embodiment, URL rules detector 220 may be used to determine if a potential URL found within the JavaScript text is a valid URL. URL rule detector 220 may include a list of URL rules that would be able to scan a URL to determine its validity. If the potential URL passes the scan from URL rules detector 220, then the URL may be sent to the Internet to begin the prefetching process. If the URL fails the scan by URL rules detector 220, then the URL may be discarded, and JavaScript parser 205 would continue to search the JavaScript text for additional candidate URLs.

Figure 3:
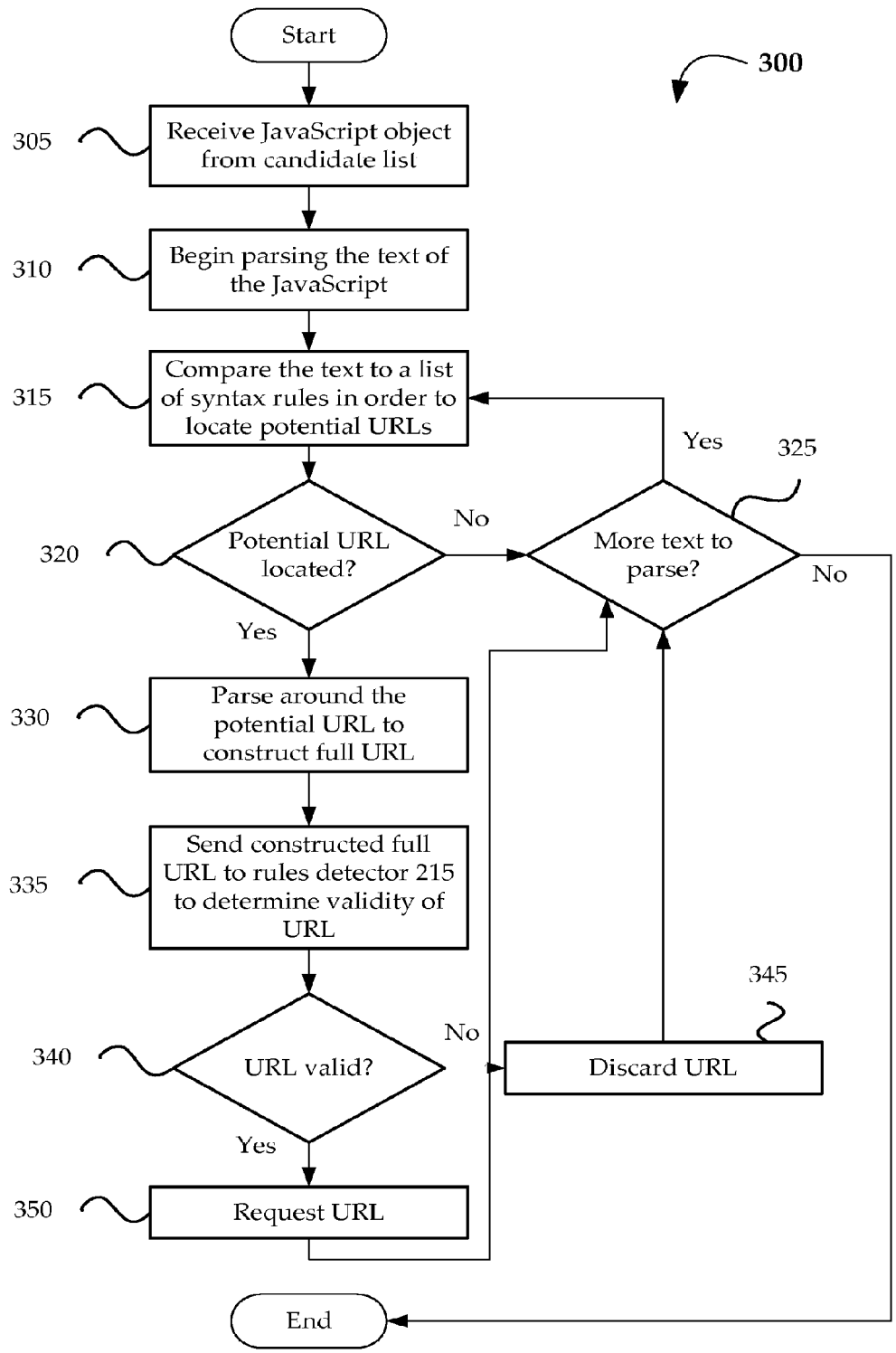
FIG. 3 is a flow diagram illustrating a method for implementing JavaScript parsing according to one embodiment of the present invention.

Turning now to FIG. 3 which illustrates method 300 according to embodiments of the invention. At process block 305, a JavaScript text is identified by prefetch scanner 146 (FIG. 1). The JavaScript text may be embedded in an HTML or CSS page or could be a complete JavaScript file. The JavaScript text includes executable code which is in text form. Prefetch scanner 146 (FIG. 1) scans, for example, the HTML of a webpage and may come across an HTML tag that indicates that an embedded JavaScript object is located within the HTML (e.g., <script language="JavaScript">).

At process block 310, JavaScript parser 205 (FIG. 2) begins parsing the JavaScript text. The parsing may include scanning the JavaScript text to identify tokens that indicate possible URLs (process block 315). A token may be the suffix of a common file type, such as ".gif" or ".jpg". A list of tokens that are likely to be part of an embedded URL is provided in the token list 215. If a sequence of bytes in the text matches a token in token list 215 (FIG. 2), a potential URL has been found. After comparing a parsed token with the syntax dictionary 210, a determination is made whether a potential URL has been located (decision block 320). In some embodiments, token list 215 (FIG. 2) could include JavaScript expressions such as "var". The expression may not be part of the URL, but the response to this token might include storing of variables useful for assembling URL strings. At decision block 320, a token that might be part of a URL that has been identified is indicated.

In one embodiment, if a potential URL is not located, then a determination is made whether there is more text in the JavaScript code to parse (decision block 325). If there is no more text to parse, then method 300 ends; otherwise, method 300 returns to process block 315 to continue parsing the JavaScript text in order to locate potential URLs.

However, if a potential URL is located, then JavaScript parser 205 (FIG. 2) continues to parse around the area where the token was located (process block 330). JavaScript parser 205 (FIG. 2) may access JavaScript rules and syntax dictionary 210 (FIG. 2) in order to concatenate together a full URL. In one embodiment, syntax dictionary 210 (FIG. 2) may allow JavaScript operators such as "+" or, for example, arrays, lists, etc. to be parsed as needed to build up the full URL. This process may be similar to a conventional JavaScript interpreter, except that this process recognizes only a subset the JavaScript language, parses in both forwards and backwards, and is only designed to assemble URLs. Thus, JavaScript parser 205 (FIG. 2) need only recognize a subset of operators in order to reassemble a large number of JavaScript expressions through which URLs are commonly constructed. JavaScript parser 205 (FIG. 2) is much simpler than a full JavaScript parser, which saves CPU usage. This is a result of the fact that JavaScript parser 205 (FIG. 2) is performing parsing only on a subset of the JavaScript data within the JavaScript file because the initial token search has enabled JavaScript parser 205 (FIG. 2) to skip over a large portion of the JavaScript data. As JavaScript parser 205 (FIG. 2) parses around the token, the URL may be built up into the full URL. After the full URL is constructed it may be sent to URL rules detector 220 (FIG. 2) to determine if the URL is valid (process block 335).

URL rules detector 220 (FIG. 2) may include a set of URL rules which may be compared to the concatenated URL in order to determine the validity of the URL. If the URL passed URL rules detector 220 (FIG. 2), then it is determined to be a valid URL (decision block 340), subsequently a request to the Internet (or other network) for the URL is transmitted (process block 350). In one embodiment, a valid response to the request is received by, for example, response parser 144 (FIG. 1). However, in an alternative embodiment, a page not found or similar error (e.g., unknown domain, unknown folder, etc.) may be returned. If a page not found error is returned, the URL may be discarded as an invalid URL. In an additional embodiment, an entry can be added into blacklist 149 (FIG. 1) so that no further requests are made for the invalid URL.

In a further embodiment, URL rules detector 220 (FIG. 2) may determine that the URL is invalid. In that case, the URL may also be discarded (process block 345) and method 300 continues to decision block 325 to determine if there is additional text in the JavaScript to parse. A number of variations and modifications of the disclosed embodiments can also be used. For example, the parser may be used with other programming languages, such as ASP, PHP, etc.

Figure 4:
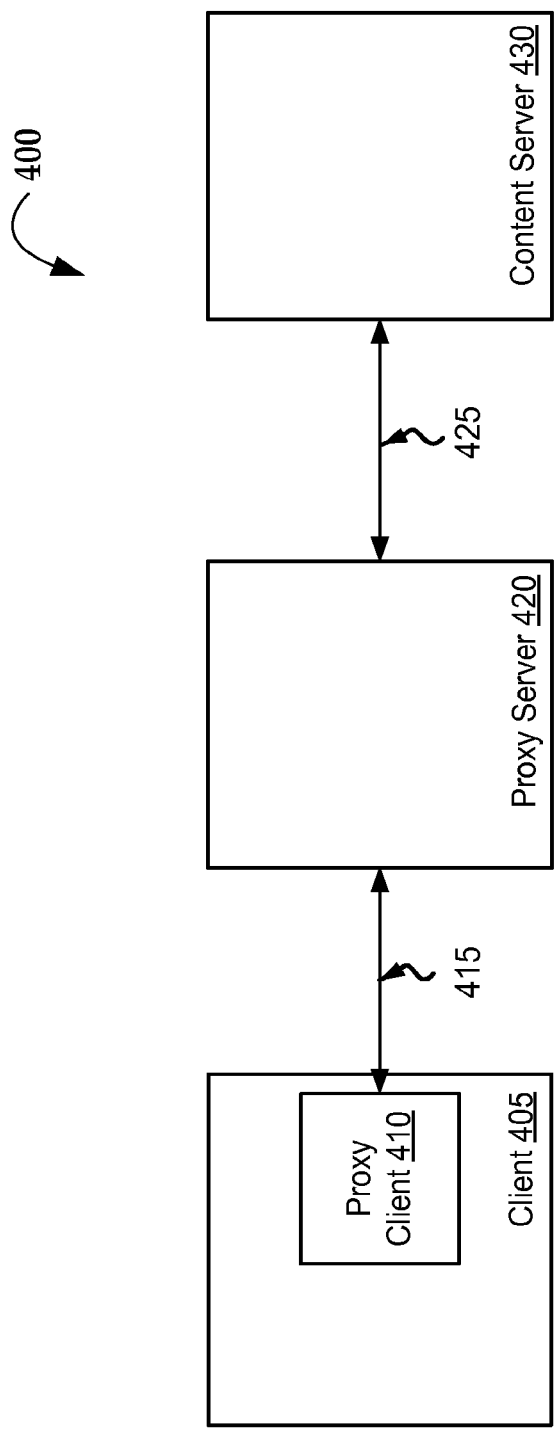
FIG. 4 is a block diagram illustrating a system for accelerating network communications according to one embodiment of the present invention.

Referring now to FIG. 4, which illustrates a system 400 for providing network acceleration. In one embodiment, user system 102 in FIG. 1 may be client 405 and proxy client 112 in FIG. 1 may be proxy client 410. Client 405 may generate a request for content from content server 430. In one embodiment, content server 430 may be a web server, a file server, a mail server, etc., and the content request may be for a file, a webpage, an email message, etc.

Proxy client 410 may be configured to intercept the content request from client 405 and transmit the request over high latency link 415 to proxy server 420 on behalf of client 405. In one embodiment, high latency link 415 may be a satellite link, a cellular link, a wireless link, etc. In one embodiment, the content request may include JavaScript to be parsed. Accordingly, proxy server 420, while pre-fetching objects from the JavaScript, would utilize the systems and methods described in FIGS. 1, 2, and 3.

In a further embodiment, communications between proxy server 420 and content server 430 over low latency link 425 are sufficiently fast that acceleration is not needed or would not provide sufficient benefit for the cost needed to accelerate. Hence, upon receipt of communications from content server 430, proxy server 420 accelerates the communications between proxy server 420 and proxy client 410 in order to accelerate communications over high latency link 415. Accordingly, the network traffic over high latency link 415 is accelerated while network traffic over low latency link 425 remains relatively unchanged.

Figure 5:
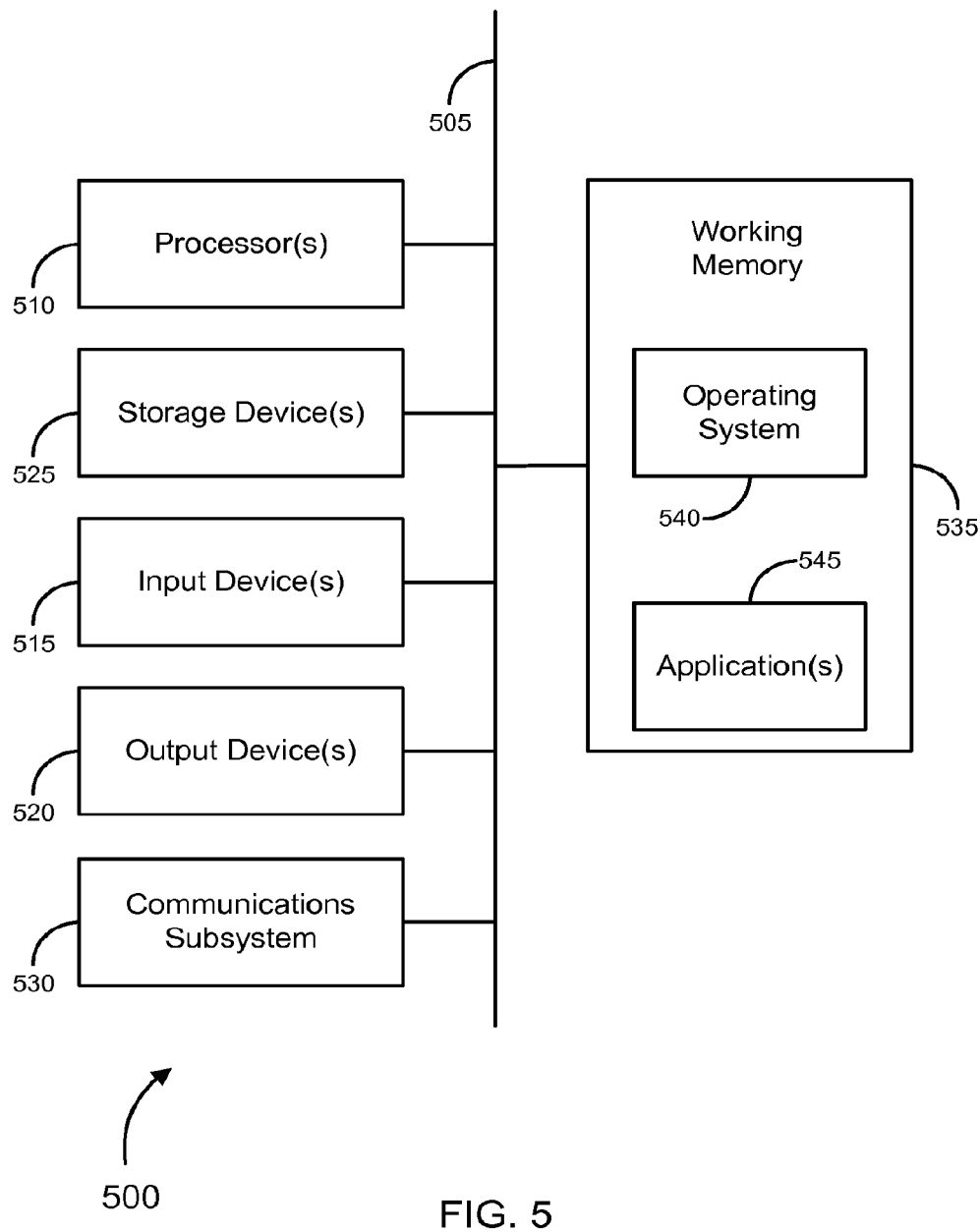
FIG. 5 is a generalized schematic diagram illustrating a computer system, in accordance with various embodiments of the invention.

FIG. 5 provides a schematic illustration of one embodiment of a computer system 500 that can perform the methods of the invention, as described herein, and/or can function, for example, as any part of client 405, proxy server 420, or content server 430 in FIG. 4. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infrared communication device, a wireless communication device and/or chipset (such as a Bluetooth®[5] device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (i.e., a removable medium such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including, without limitation, radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
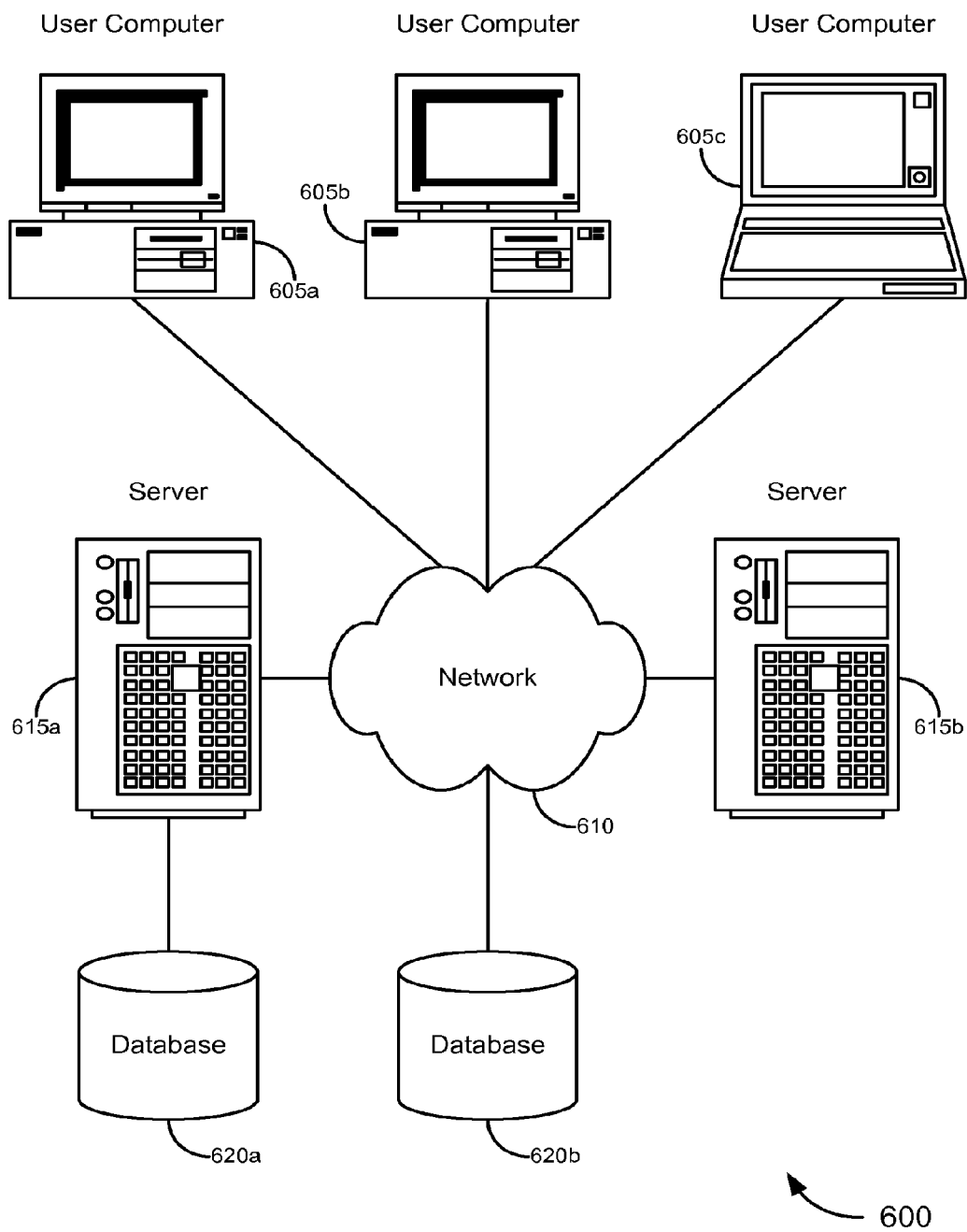
FIG. 6 is a block diagram illustrating a networked system of computers, which can be used in accordance with various embodiments of the invention.

A set of embodiments comprises systems for implementing staged configurator modeling. In one embodiment, proxy server 420 and/or client 405 (FIG. 4) may be implemented as computer system 500 in FIG. 5. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate version of Windows®[2] operating systems and/or Mac OS®[6]) and/or workstation computers running any of a variety of commercially-available UNIX®[7] or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk®[6], and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java®[1] servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java, C, C# or C++, and/or any scripting language, such as Perl, Python, or TCL, as well as combinations of any programming/scripting languages. The application server(s) can also include database servers, including without limitation those commercially available from Oracle, Microsoft, Sybase, IBM and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention, such as information displayed web browser 106 in FIG. 1. Data provided by an application server may be formatted as web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620*a* might reside on a storage medium local to (and/or resident in) a server 615*a* (and/or a user computer 605). Alternatively, a database 620*b* can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle®[1] database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

APPENDIX

[1] "JavaScript", "Java", and "Oracle" are registered trademarks of Oracle and/or its affiliates. Other names may be trademarks of their respective owners.
[2] "Microsoft", "Internet Explorer", and "Windows" are either registered trademarks or trademarks of Microsoft Corporation in the United States and/or other countries.
[3] "Mozilla" and "Firefox" are registered trademarks of the Mozilla Foundation.
[4] "Netscape" and "Netscape Navigator" are registered trademarks of Netscape Communications Corporation in the United States and other countries.
[5] The "Bluetooth" word mark and logos are registered trademarks owned by Bluetooth SIG, Inc. Other trademarks and trade names are those of their respective owners.
[6] "Mac OS" and "AppleTalk" are registered trademarks of Apple, Inc., registered in the U.S. and other countries.
[7] "UNIX" is a registered trademark of The Open Group.

What is claimed is:

1. A method of parsing a script within an HTML page, the method comprising:
   receiving a script object, wherein the script object includes text;
   parsing the text of the script object to determine whether the parsed text matches tokens included in a syntax dictionary, the matching tokens corresponding in the syntax dictionary with syntax identified as useful in constructing universal resource locators (URLs);
   parsing the text of the script object before and after the matching tokens in accordance with the corresponding syntax to construct a plurality of proposed complete URLs are constructed;
   forwarding the proposed complete URLs to a detector that determines whether each proposed complete URL is a valid complete URL; and
   sending object retrieval requests to websites associated with the valid complete URLs.

2. The method for parsing a script within an HTML page as recited in claim 1, wherein the parsing of the text of the script object comprises parsing a subset of the text of the script object.

3. The method for parsing a script within an HTML page as recited in claim 1, wherein the script object is at least one of a Javascript object, an active server page (ASP) object, and a personal hypertext processor (PHP) object.

4. The method for parsing a script within an HTML page as recited in claim 1, further comprising in response to sending an object retrieval request to a website associated with one of the valid complete URLs, receiving a page not found error.

5. The method for parsing a script within an HTML page as recited in claim 4, further comprising in response to receiving the page not found error, discarding the one of the valid complete URLs.

6. The method for parsing a script within an HTML page as recited in claim 1, further comprising checking the script object to determine if there is additional text to parse.

7. The method for parsing a script within an HTML page as recited in claim 1, wherein the determination of whether a URL is valid comprises comparing the URL to a blacklist of URLs.

8. The method for parsing a script within an HTML page as recited in claim 1, wherein the valid tokens list includes one or more of the following: a ".jpg" token, a ".gif" token, an ".asp" token, and a "var" token.

9. A system for accelerating network communications, the system comprising:
   a client system including a proxy client configured to intercept a content request generated by the client, and to transmit the request;
   a proxy server coupled with the client system via the proxy client, the proxy server including a script parser configured to: receive a script object, wherein the script object includes text; to parse the text of the script object to determine whether the parsed text matches tokens included in a syntax dictionary, the matching tokens corresponding in the syntax dictionary with syntax identified as useful in constructing universal resource locators (URLs); and to parse the text of the script object before and after the matching tokens in accordance with the corresponding syntax to construct a plurality of proposed complete URLs, wherein the proxy server further includes a detector which is configured to receive the proposed complete URLs to determine whether each is a valid complete URL; and
   a content server coupled with the proxy server, the content server configured to receive object retrieval requests associated with the valid complete URLs from the proxy server, and transmit objects associated with the valid completed URLs to the proxy server.

10. A system for accelerating network communications as recited in claim 9, wherein the proxy server further comprises a prefetch scanner configured to scan an attached file associated with one or more of the identified valid URLs to determine candidates for prefetching.

11. A system for accelerating network communications as recited in claim 9, wherein the client and the proxy server are coupled together via a high latency communications link.

12. A system for accelerating network communications as recited in claim 11, wherein the high latency link is one or more of the following: a satellite link, a wireless link, and a cellular link.

13. A system for accelerating network communications as recited in claim 9, wherein the proxy server and the proxy client are couple together via a low latency link.

14. A system for accelerating network communications as recited in claim 13, wherein the low latency link is one or more of the following: a digital subscriber line (DSL), a cable modem link, a T1 connection, and a fiber optic connection.

15. A system for accelerating network communications as recited in claim 9, wherein the script parser further comprises a script rules dictionary coupled to the syntax dictionary, the script rules dictionary configured to provide script rules used to create valid URLs from portions of the received script text.

16. A system for accelerating network communications as in claim 15, wherein the script rules dictionary is further configured to concatenate portions of the script text into valid URLs based on the script's rules.

17. A system for accelerating network communications as in claim 16, wherein the script rules are Java™ script rules.

18. A machine-readable medium for parsing script files including sets of instructions stored thereon which, when executed by a machine, cause the machine to:
   receive a script object, wherein the script object includes text;
   parse the text of the script object to determine whether the parsed text matches tokens included in a syntax dictionary, the matching tokens corresponding in the syntax dictionary with syntax identified as useful in constructing universal resource locators (URLs);
   parse the text of the script object before and after the matching tokens in accordance with the corresponding syntax to construct a plurality of proposed complete URLs;
   forward the complete URLs to a detector that determines whether each of the proposed complete URLs is a valid complete URL; and
   send object retrieval requests to websites associated with the valid complete URLs.

* * * * *